United States Patent
Lim

(10) Patent No.: US 8,646,281 B2
(45) Date of Patent: Feb. 11, 2014

(54) PHOTOVOLTAIC MODULE WITH COOLING DEVICE AND MANUFACTURING METHOD OF COOLING DEVICE

(75) Inventor: Byung-Duck Lim, Seoul (KR)

(73) Assignee: Youna T & E Co., Ltd., Seoul (KR)

( * ) Notice: Subject to any disclaimer, the term of this patent is extended or adjusted under 35 U.S.C. 154(b) by 293 days.

(21) Appl. No.: 13/264,403

(22) PCT Filed: Apr. 6, 2010

(86) PCT No.: PCT/KR2010/002097
§ 371 (c)(1),
(2), (4) Date: Oct. 14, 2011

(87) PCT Pub. No.: WO2010/123210
PCT Pub. Date: Oct. 28, 2010

(65) Prior Publication Data
US 2012/0037210 A1  Feb. 16, 2012

(30) Foreign Application Priority Data

Apr. 21, 2009 (KR) .................. 10-2009-0034453
Jan. 29, 2010 (KR) .................. 10-2010-0008577

(51) Int. Cl.
*F25B 21/02* (2006.01)

(52) U.S. Cl.
USPC ............................................. 62/3.2; 60/235.1

(58) Field of Classification Search
USPC ............. 62/3.2, 235.1, 236; 136/244, 246; 126/612, 634, 635, 674; 165/104.21, 165/104.26
See application file for complete search history.

(56) References Cited

U.S. PATENT DOCUMENTS

| | | | | |
|---|---|---|---|---|
| 4,255,212 A | * | 3/1981 | Chappell et al. | 438/66 |
| 4,306,543 A | * | 12/1981 | Doevenspeck et al. | 126/638 |
| 4,474,170 A | * | 10/1984 | McConnell et al. | 126/636 |
| 4,513,732 A | * | 4/1985 | Feldman, Jr. | 126/570 |
| 4,686,961 A | * | 8/1987 | Garrison | 126/635 |
| 4,920,067 A | * | 4/1990 | Knapp | 117/61 |
| 5,578,141 A | * | 11/1996 | Mori et al. | 136/251 |
| 7,109,520 B2 | * | 9/2006 | Yu et al. | 257/40 |
| 7,340,899 B1 | * | 3/2008 | Rubak et al. | 60/641.8 |
| 7,638,705 B2 | * | 12/2009 | Venkatasubramanian | 136/206 |
| 7,727,847 B2 | * | 6/2010 | Tanaka et al. | 438/314 |

FOREIGN PATENT DOCUMENTS

| | | |
|---|---|---|
| JP | 10-321890 | 12/1998 |
| JP | 2004-247429 | 9/2004 |
| JP | 2009-032852 | 2/2009 |
| KR | 10-0617444 | 8/2006 |

* cited by examiner

*Primary Examiner* — Mohammad M Ali
(74) *Attorney, Agent, or Firm* — Lexyoume IP Meister, PLLC.

(57) ABSTRACT

The present invention relates to a photovoltaic module with a cooling device and a method of manufacturing the cooling device. The photovoltaic module includes a photovoltaic module, a cooling chamber and a heat sink. The photovoltaic module includes solar cells connected to each other in series and in parallel. The cooling chamber includes an upper plate, a lower plate and a working fluid. The upper plate is attached to the photovoltaic module and has a flange formed on the edge thereof. The lower plate has a flange formed on the edge thereof. The flanges of the upper and lower plates are joined to each other so that an inner space is defined between the upper and lower plates. The working fluid is injected into the inner space so that a cooling operation can be carried out by means of boiling and condensing. The heat sink is in surface contact with the lower plate of the cooling chamber.

32 Claims, 7 Drawing Sheets

[Fig.1]
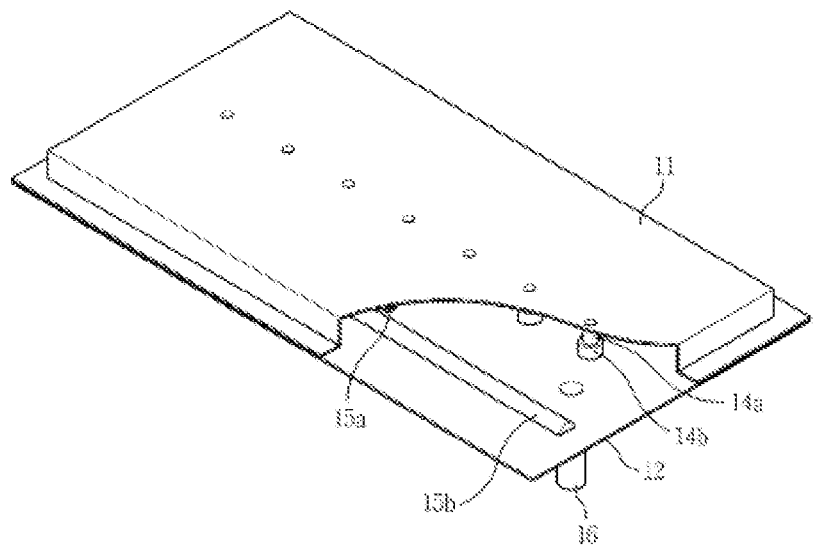
[Fig.2]
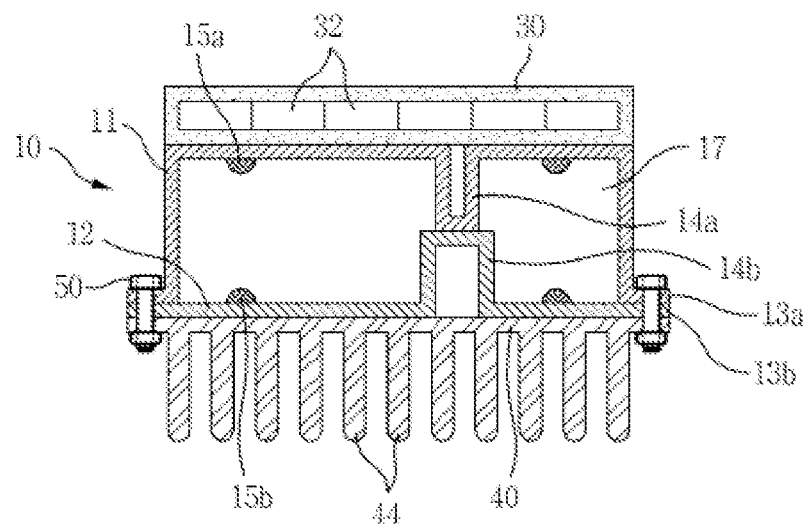

[Fig.3]
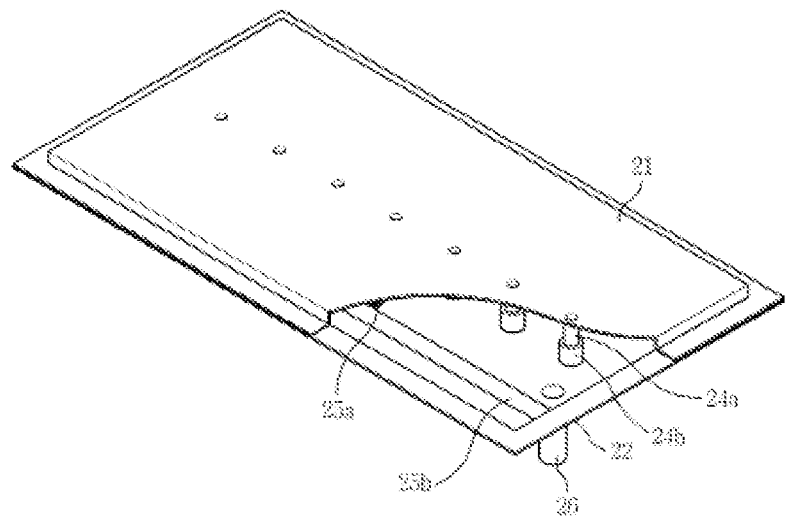
[Fig.4]
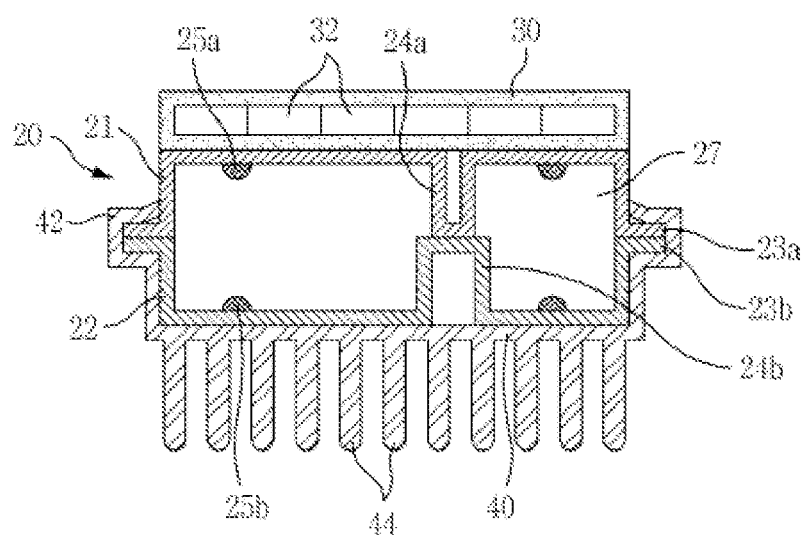

[Fig.5]
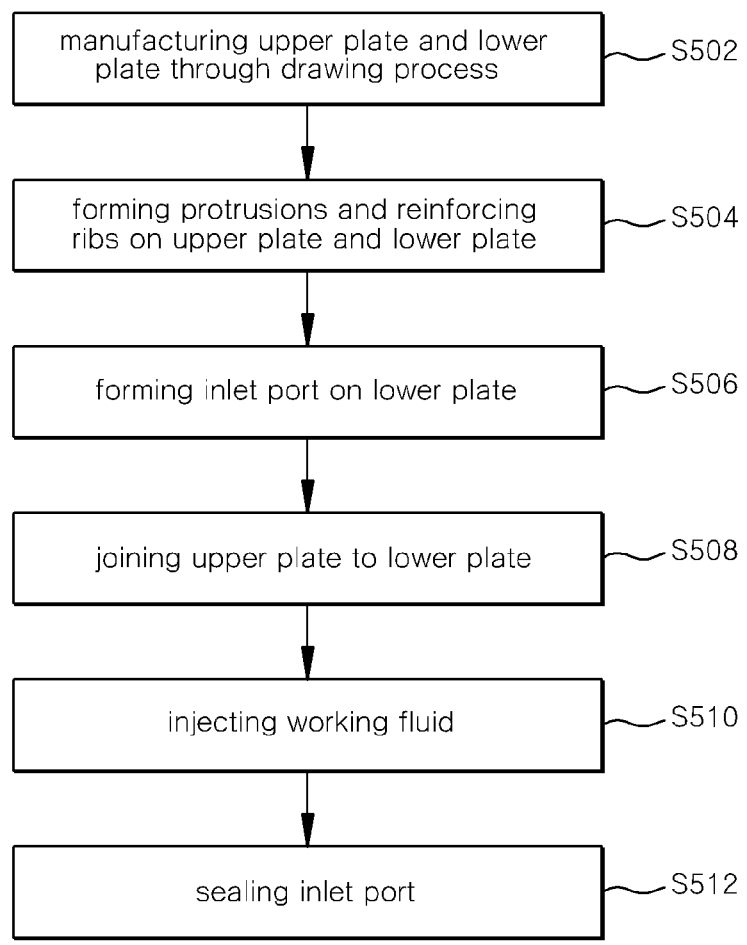

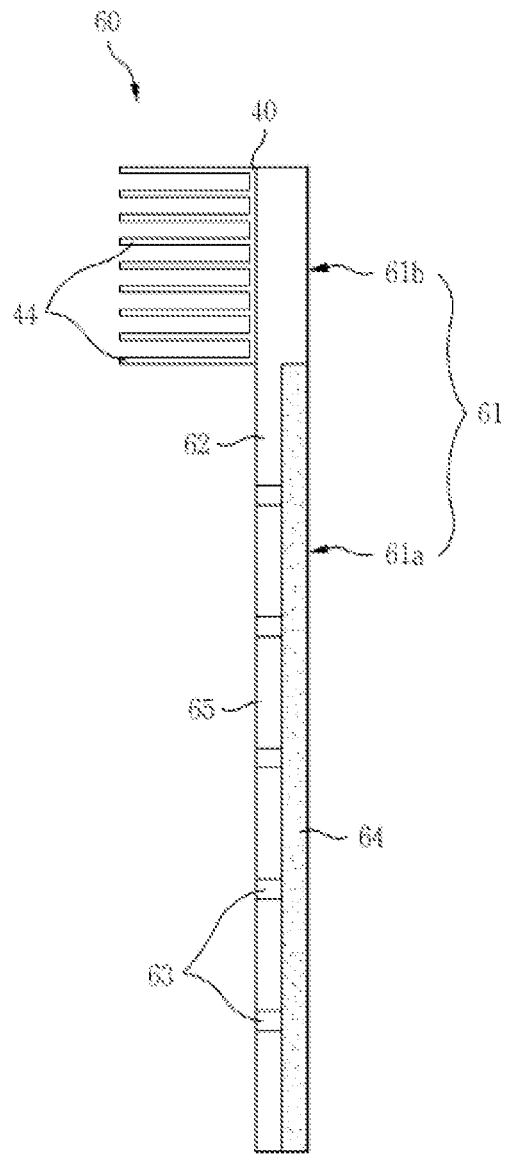
[Fig.6]

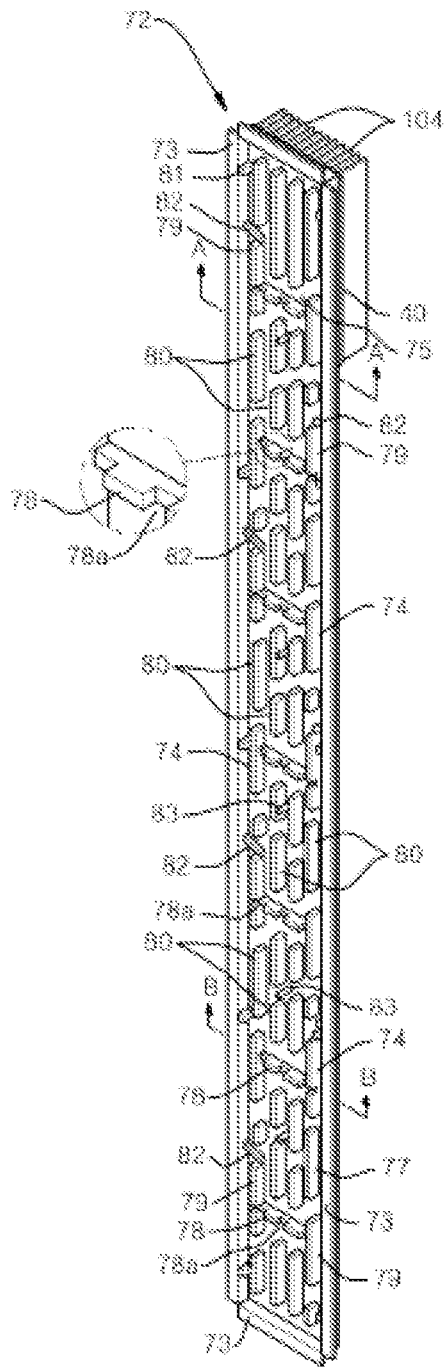
[Fig.7]

[Fig.8]
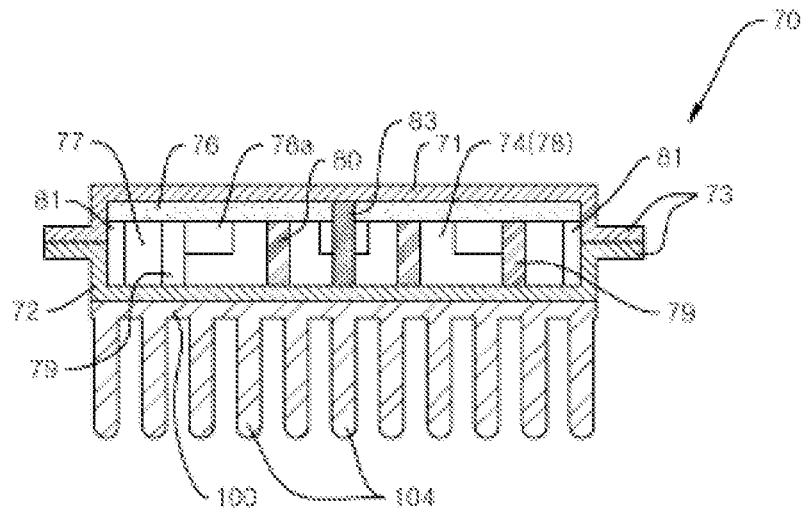
[Fig.9]
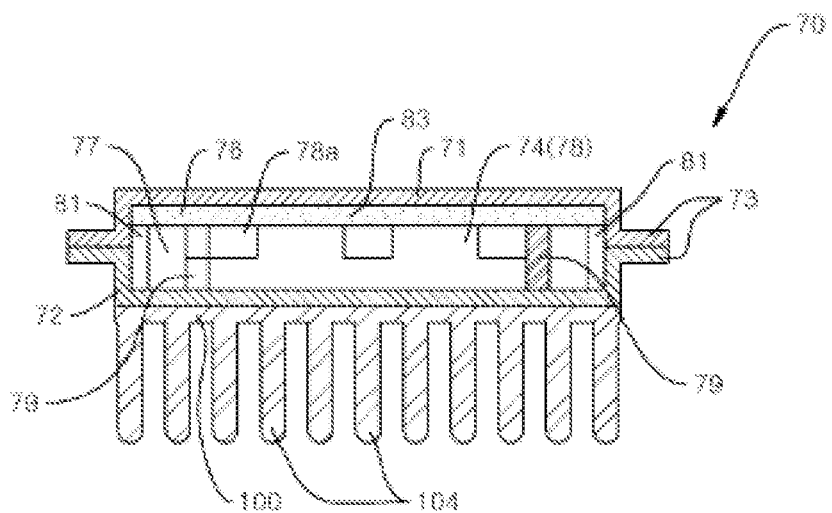

[Fig.10]
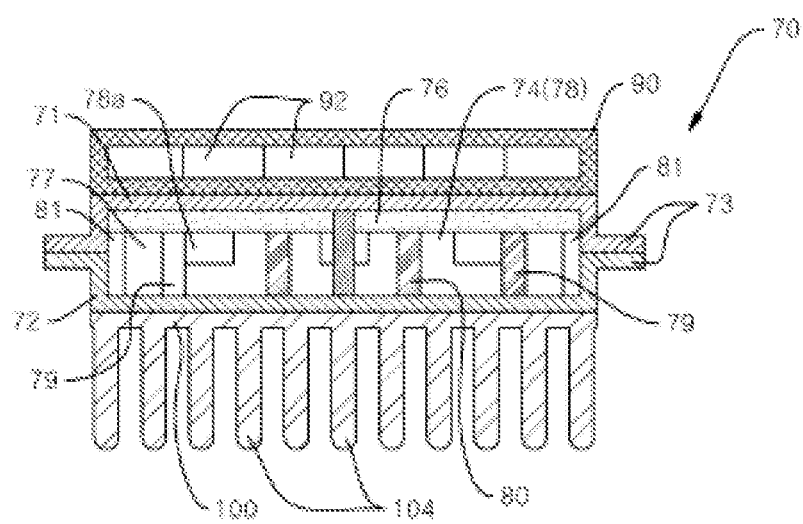

PHOTOVOLTAIC MODULE WITH COOLING DEVICE AND MANUFACTURING METHOD OF COOLING DEVICE

TECHNICAL FIELD

The present invention relates generally to photovoltaic modules with cooling devices and methods of manufacturing the cooling devices and, more particularly, to a photovoltaic module which is configured such that the temperature thereof is reduced by a cooling device, thus enhancing the output efficiency and the performance, and extending the life span, and a method of manufacturing the cooling device.

BACKGROUND ART

Solar cells use the characteristics of semiconductors to convert solar light into electric energy. The solar cells receive attention as an alternative energy source which can substitute for existing energy sources, such as petroleum, coal, etc., because the solar light is abundant and does not cause environmental pollution.

Such a solar cell is the minimum unit which uses solar light to generate electricity. Photovoltaic modules include a plurality of solar cells which are connected in series to each other to produce the appropriate voltage and current. Such a photovoltaic module is manufactured in such a way that after solar cells are connected in series, they along with a filler, glass, etc. are pressed to be protected from the external environment. The photovoltaic module is installed to be oriented towards the southern sky in the northern hemisphere to increase the amount of solar light it receives.

However, the energy conversion efficiency of the solar cells ranges between 10% and 20%. The reason that the energy conversion efficiency is comparatively low is that the solar cells can convert only some of the received solar light into electric energy. The light energy that has not been converted into the electric energy is converted into thermal energy (the energy loss attributable to this is 60% of the entire energy loss), thus increasing the temperature of the photovoltaic module.

Due to the characteristics of the solar cells, the output of power of the photovoltaic module is reduced by an increase in temperature. If the generating efficiency is 100% at 25° C., the output of power is reduced by 0.45% to 0.55% every increase in the temperature of 1° C.

That is, in the solar cells, the temperature is inversely proportional to the output voltage. Hence, as the temperature increases, the output voltage is reduced, thus reducing the generating output of power. As a result, in the hot summer, the power output generation is low, considering the amount of solar radiation.

Further, the increase in temperature causes deterioration of the solar cells. Thus, the power output generation becomes less over time.

To prevent these problems, a method of planting grass or spacing solar cells apart from each other to cool them in an air-cooling manner has been used, but the effect of a reduction in temperature is insignificant.

In addition, a forced cooling technique using equipment such as a cooling fan or the like may be used to cool the solar cells. This requires electricity, incurring additional costs. Moreover, additional labor is required to manage and maintain the equipment. Therefore, the effect which can be obtained by reducing the temperature becomes very low, considering the required expenses. Thus, this technique cannot be actualized.

DISCLOSURE

Technical Problem

Accordingly, the present invention has been made keeping in mind the above problems occurring in the prior art, and an object of the present invention is to provide a photovoltaic module with a cooling device in which a sealed cooling chamber that contains therein working fluid for carrying out the cooling operation by being boiled and condensed is in surface contact with a rear surface of the photovoltaic module that is a non-light-receiving surface, thus increasing the cooling efficiency, thereby further reducing the temperature of the photovoltaic module and increasing the output efficiency thereof, and which prevents solar cells from deteriorating due to heat, thus enhancing the performance of the solar cells and extending the lift spans of the solar cells, and a method of manufacturing the cooling device.

Another object of the present invention is to provide a photovoltaic module with the cooling device in which reservoirs are formed in the cooling chamber at positions spaced apart from each other to store the working fluid so that the working fluid can be evenly distributed in the cooling chamber, thus even more efficiently cooling the heat generated form the photovoltaic module, thereby further extending the life span of the photovoltaic module, and a method of manufacturing the cooling device.

Technical Solution

In order to accomplish the above object, in an aspect, the present invention provides a photovoltaic module having a cooling device, including: a photovoltaic module comprising a plurality of solar cells connected to each other in series and in parallel; a cooling chamber having an upper plate attached to a rear surface of the photovoltaic module in such a way as to be in surface contact with each other, the upper plate having a predetermined height, with a flange formed on a peripheral edge of the upper plate, a lower plate having a planar shape, with a flange formed on a peripheral edge of the lower plate, the flange of the lower plate being joined to the flange of the upper plate so that an inner space is defined between the upper plate and the lower plate, and a working fluid injected into the inner space, the working fluid carrying out a cooling operation by means of boiling and condensing, wherein a plurality of protrusions are formed on the upper plate and the lower plate by pressing predetermined portions of the upper and lower plates inwards in such a way as to face each other, the protrusions being joined to each other; and a heat sink in surface contact with the lower plate of the cooling chamber, the heat sink dissipating heat to an outside.

In another aspect, the present invention provides a photovoltaic module, having a cooling device including: a cooling chamber attached to a rear surface of the photovoltaic module, the rear surface being a non-light-receiving surface, the cooling chamber comprising an upper plate and a lower plate, with a working fluid contained in an inner space defined by the upper plate and the lower plate, the inner space being sealed up, the working fluid carrying out a cooling operation by means of boiling and condensing; and a heat sink in surface contact with the cooling chamber to dissipate heat to an outside, wherein a plurality of reservoirs are formed on the lower plate in a longitudinal direction of the cooling chamber, the reservoirs storing the working fluid while the working fluid flows downwards along the lower plate because of the boiling and condensing, and a wick is provided under the upper plate, the wick absorbing and containing the working fluid therein.

In a further aspect, the present invention provides a method of manufacturing a cooling device of a photovoltaic module, including: manufacturing an upper plate and/or a lower plate through a drawing process, the upper plate and/or the lower plate having predetermined heights and flanges; pressing portions of the upper and lower plates to form protrusions corresponding to each other at positions spaced apart from each other at predetermined intervals, and forming a reinforcing rib on each of the upper and lower plates in a longitudinal direction; forming an inlet port on the lower plate so that working fluid is injected therethrough; joining the protrusions to each other and joining the flanges to each other to join the upper plate to the lower plate; and injecting the working fluid through the inlet port of the lower plate, drawing out air to make a vacuum, and sealing the inlet port.

Advantageous Effects

According to the technical solution, the contact area between a photovoltaic module and a cooling chamber is maximized so that the cooling efficiency is enhanced, thus further reducing the temperature of the photovoltaic module. Thereby, the output efficiency of the photovoltaic module can be enhanced.

Furthermore, thanks to the reduction in the temperature of the photovoltaic module, heat can be prevented from deteriorating the solar cells. Hence, the performance of the solar cells can be enhanced, and the lifespan of the solar cells can be extended.

In addition, working fluid can be supplied to the entire area in the cooling chamber. Thereby, the boiling and condensing of the working fluid are further activated, so that the heat generated from the photovoltaic module can be more efficiently removed. Thus, the lifespan of the photovoltaic module can be further extended.

DESCRIPTION OF DRAWINGS

FIG. 1 is a partially broken perspective view of a cooling device, according to a first embodiment of the present invention;

FIG. 2 is a sectional view showing an embodiment of the installation of the cooling device of FIG. 1;

FIG. 3 is a partially broken perspective view of a cooling device, according to a second embodiment of the present invention;

FIG. 4 is a sectional view showing an embodiment of the installation of the cooling device of FIG. 3;

FIG. 5 is a flowchart of a method of manufacturing a cooling device according to the present invention;

FIG. 6 is a schematic view showing the construction of a cooling device, according to a third embodiment of the present invention;

FIG. 7 is a perspective view showing a lower plate of the cooling chamber assembled with a heat sink according to the third embodiment of the present invention;

FIGS. 8 and 9 are, respectively, sectional views of the cooling device taken along line A-A and B-B of FIG. 7; and FIG. 10 is a sectional view showing the installation of the cooling device of FIG. 8.

BEST MODE

Hereinafter, the construction and operation of each embodiment of the present invention will be described in detail with reference to the attached drawings.

FIG. 1 is a partially broken perspective view of a cooling device, according to a first embodiment of the present invention. FIG. 2 is a sectional view showing an embodiment of the installation of the cooling device of FIG. 1.

In the drawings, a side at which a photovoltaic module 30 is disposed refers to an upper side, and the opposite side refers to a lower side.

As shown in the drawings, the cooling chamber 10 includes an upper plate 11 which is in contact with a lower surface of the photovoltaic module 30, and a lower plate 12 which is in contact with a heat sink 40. The cooling chamber 10 is sealed after working fluid that is boiled and condensed to carry out the cooling operation has been injected into the cooling chamber 10.

The lower plate 12 comprises a flat plate, and the perimeter thereof forms a flange 13b.

The upper plate 11 is bent downwards, to have a predetermined height, by drawing a plate made of the same material as that of the lower plate 12. A lower edge (a perimeter) of the upper plate 11 is bent outwards, thus forming a flange 13a.

Any type structure, for example, a heat pipe, a thermosyphon, etc., can be used as the cooling chamber 10, so long as it can boil and condense the working fluid to carry out the cooling operation.

The upper plate 11 and the lower plate 12 are made of SUS. The flanges 13a and 13b of the upper plate 11 and the lower plate 12 are welded or brazed to each other, so that an inner space 17 containing the working fluid therein is defined between the upper plate 11 and the lower plate 12.

The flanges 13a and 13b are directly coupled to the heat sink 40 when the upper plate 11 and the lower plate 12 are joined to each other and coupled to the heat sink 40.

As a method of welding the flanges 13a and 13b to each other, a seam welding method may be used, including: overlapping the flanges 13a and 13b; putting pressure on the junction therebetween; and applying currents to the junction, or a butt welding method may be used, including: respectively connecting the flanges 13a and 13b to two electrodes; bringing the flanges 13a and 13b into contact with each other; and pressing them to each other.

A plurality of protrusions 14a and 14b corresponding to each other are respectively formed on the upper plate 11 and the lower plate 12 by pressing predetermined portions of the upper and lower plates 11 and 12 inwards in such a way that they face each other. In this embodiment, in each of the upper and lower plates 11 and 12, the protrusions 14a, 14b are spaced apart from each other in the longitudinal direction of the plate.

The protrusions 14a and 14b corresponding to each other are joined to each other by welding. Because of the protrusions 14a and 14b that are joined to each other, even if the inner space 17 creates a vacuum, the upper plate 11 and the lower plate 12 can maintain their original shape without shrinking.

As a method of welding the protrusions 14a and 14b to each other, a spot welding method can be used, including: overlapping the protrusions 14 and 14b; applying currents thereto to heat them; and applying pressure thereto so that they are welded to each other in a spot shape.

Reinforcing ribs 15a and 15b are respectively provided on the upper surfaces of the upper and lower plates 11 and 12 in the longitudinal direction of the upper and lower plates 11 and 12. The reinforcing ribs 15a and 15b function to reinforce the upper and lower plates 11 and 12 to prevent them from bending inwards or outwards. In addition, the reinforcing ribs 15a and 15b also function to guide the flow of the working fluid.

Working fluid is injected into the inner space 17 defined between the upper plate 11 and the lower plate 12. An inlet port 16 made of Cu or SUS is provided on the lower plate 12 to inject the working fluid.

After a predetermined amount of working fluid has been injected into the inner space 17 through the inlet port 16, air is drawn out from the inner space 17 to make a vacuum. Subsequently, the inlet port 16 is pressed on both sides to be sealed.

The reason that the inlet port 16 is disposed on the lower plate 12 which is in contact with the heat sink 40 is that it is very difficult to form the inlet port 16 on the sidewall of the cooling chamber 10 because the thickness of the cooling chamber 10 including the upper plate 11 and the lower plate 12 is about 5 mm, in other words, is comparatively small.

As such, after the upper plate 11 and the lower plate 12 are joined to each other and the working fluid is injected into the inner space defined therebetween, the inner space is vacuum-sealed, thus completing the manufacture of the cooling chamber 10.

In the embodiment, because the protrusions 14a and 14b of the upper and lower plates 11 and 12 are welded to each other at each of positions spaced apart from each other at regular intervals, even through the cooling chamber 10 becomes a vacuum state, the cooling chamber 10 can be maintained in its original shape without shrinking.

The cooling chamber 10 manufactured by the above-mentioned method is attached to the photovoltaic module 30 in such a way that the upper plate 11 makes surface contact with the lower surface of the photovoltaic module 30. Thereafter, the flanges 13a and 13b of the upper and lower plates 11 and 12 are coupled to the heat sink 40 by fastening members 50 so that the heat sink 40 is attached to the lower plate 12 of the cooling chamber 10.

The photovoltaic module 30 and the cooling chamber 10 may be attached to each other by a thermal conductive adhesive or, alternatively, a bolting method using nuts and bolts.

As shown in FIG. 4, the heat sink 40 may be coupled to the cooling chamber 10 by a sliding coupling method using a clip 42.

Furthermore, the upper plate 11 of the cooling chamber 10 is in surface contact with the entirety of the lower surface of the photovoltaic module 30. The heat sink 40 is in surface contact with the entire surface or a portion of the cooling chamber 10. In the case of the partial surface contact, if the photovoltaic module is installed at an inclination, the heat sink 40 is disposed on an upper portion of the inclined cooling chamber 10.

Meanwhile, to produce the required power, after the photovoltaic module 30 is installed at an inclination in such a way that it faces the southern sky to receive a large quantity of solar light, solar cells 32 constituting the photovoltaic module 30 receive solar light and convert it into electric energy, thus generating voltage. The voltage generated by the solar cells 32 are gathered together and then output to the outside of the photovoltaic module 30.

In each solar cell 32, some solar light cannot be converted into electric energy. The solar light energy that has not been converted into electric energy is converted into thermal energy, thus increasing the temperature of the photovoltaic module 30.

Heat of the photovoltaic module 30 is transferred to the working fluid of the cooling chamber 10 through the upper plate 11 which is in surface contact with the lower surface of the photovoltaic module 30. The working fluid is evaporated by the heat and ascends in a vapor phase along the inclination of the cooling chamber 10. The ascending vapor transfers heat to the heat sink 40 or the air and thus condenses and cools off.

The condensed liquid moves downwards along the inclined inner surface of the cooling chamber 10 due to the force of gravity. Heat generated from the photovoltaic module 30 can be cooled by repeating the above-mentioned process.

Here, there is the risk of the upper plate 11 and the lower plate 12 being bent inwards or outwards due to boiling and condensing of the working fluid. However, in the present invention, the longitudinal reinforcing ribs 15a and 15b prevent the upper and lower plates 11 and 12 from being bent. In addition, the reinforcing ribs 15a and 15b also function as guides which guide the flow of the working fluid.

As such, because the upper plate 11 and the lower plate which are formed by a drawing process are in surface contact with the lower surface of the photovoltaic module 30 and the heat sink 40, the contact area, that is, the heat transfer area, increases, so that the cooling efficiency can be markedly enhanced. Thereby, the temperature of the photovoltaic module 30 can be restrained from excessively increasing, thus preventing heat from deteriorating the solar cells 32, and increasing the performance and lifespan of the solar cells 32.

If the photovoltaic module 30 is not sufficiently cooled by the cooling chamber 10 and the heat sink 40, an additional cooling fan may be attached to the heat sink 40 to supply air between dissipation fins 44 of the heat sink 40, thus enhancing the cooling performance.

Furthermore, a thermoelement which is operated by current applied thereto may be directly attached to the cooling chamber 10 to further enhance the cooling performance.

The thermoelement is a Peltier element in which an N-type semiconductor element and a P-type semiconductor element are connected to each other by a metal plate. When power is supplied to the thermoelement, current is transmitted to the N-type semiconductor element through a first metal contact plate and then flow to a second metal contact plate via a metal connection plate and the P-type semiconductor element. Here, the first and second metal contact plates generate heat, and the metal connection plate absorbs heat.

FIG. 3 is a partially broken perspective view of a cooling device, according to a second embodiment of the present invention. FIG. 4 is a sectional view showing an embodiment of the installation of the cooling device of FIG. 3.

As shown in the drawings, a cooling chamber 20 includes an upper plate 21 which is in contact with a lower surface of a photovoltaic module 30, and a lower plate 22 which is in contact with a heat sink 40. The cooling chamber 20 is sealed after working fluid that carries out cooling operation by being boiled and condensed has been injected into the cooling chamber 10.

The upper plate 21 and the lower plate 22 are bent inwards toward each other, to have predetermined heights, by drawing flat plates. Edges of the upper and lower plates 21 and 22 are bent outwards, thus forming flanges 23a and 23b.

Any type structure, for example, a heat pipe, a thermosyphon, etc., can be used as the cooling chamber 20, so long as it can carry out the cooling operation by boiling and condensing the working fluid.

The upper plate 21 and the lower plate 22 are made of SUS. The flanges 23a and 23b of the upper plate 21 and the lower plate 22 are welded or brazed to each other, so that an inner space 27 containing the working fluid therein is defined between the upper plate 21 and the lower plate 22.

A plurality of protrusions 24a and 24b corresponding to each other are respectively formed on the upper plate 21 and the lower plate 22 by pressing predetermined portions of the upper and lower plates 21 and 22 inwards in such a way that they face each other. In this embodiment, in each of the upper and lower plates 21 and 22, the protrusions 24a, 24b are spaced apart from each other in the longitudinal direction of the plate.

The protrusions 24a and 24b corresponding to each other are joined to each other by welding. Because of the protrusions 24a and 24b joined to each other, even if the inner space 27 creates a vacuum, the upper plate 21 and the lower plate 22 can be maintained in their original shape without shrinking.

Furthermore, reinforcing ribs 25a and 25b are respectively provided on the upper surfaces of the upper and lower plates 21 and 22 in the longitudinal direction of the upper and lower plates 21 and 22. The reinforcing ribs 25a and 25b reinforce the upper and lower plates 21 and 22 to prevent them from being bent inwards or outwards. In addition, the reinforcing ribs 25a and 25b also function to guide the flow of the working fluid.

A predetermined amount of working fluid is injected into the inner space 27 defined between the upper plate 21 and the lower plate 22. An inlet port 26 made of Cu or SUS is provided on the lower plate 22 so that the working fluid can be injected.

After a predetermined amount of working fluid has been injected into the inner space 27 through the inlet port 26, air is drawn out from the inner space 27 to make a vacuum. Subsequently, the inlet port 26 is pressed on both sides to be sealed.

As such, after the upper plate 21 and the lower plate 22 are joined to each other and the working fluid is injected into the inner space defined therebetween, the inner space is vacuum-sealed, thus completing the manufacture of the cooling chamber 20.

In this embodiment, because the protrusions 24a and 24b of the upper and lower plates 21 and 22 are welded to each other at each of positions spaced apart from each other at regular intervals, even though the cooling chamber 20 is put in a vacuum state, the cooling chamber 20 can maintain its original shape without shrinking.

The cooling chamber 20 manufactured by the above-mentioned method is attached to the photovoltaic module 30 in such a way that the upper plate 21 is put in surface contact with the lower surface of the photovoltaic module 30. Thereafter, an elastic clip 42 which is provided on the heat sink 40 is fitted over the flanges 23a and 23b of the upper and lower plates 21 and 22 so that the heat sink 40 is attached to the lower plate 22 of the cooling chamber 20.

As such, the heat sink 40 can be easily coupled to the cooling chamber 20 merely by tightly fitting the clip 42 of the heat sink 40 over the flanges 23a and 23b of the upper and lower plates 21 and 22.

Further, the photovoltaic module 30 and the cooling chamber 20 may be attached to each other by a thermal conductive adhesive or, alternatively, a bolting method using nuts and bolts.

Moreover, the upper plate 11 of the cooling chamber 10 is in surface contact with the entirety of the lower surface of the photovoltaic module 30. The heat sink 40 is in surface contact with the entire surface or a portion of the cooling chamber 10. In the case of the partial surface contact, if the photovoltaic module is installed so as to be inclined at an angle, the heat sink 40 is disposed on an upper portion of the inclined cooling chamber 10.

The operation and effect of the cooling device according to the second embodiment are the same as those of FIGS. 1 and 2, and the technique of the cooling fan or thermoelement being used to supplement the cooling performance was also described above, therefore further explanation will be omitted.

FIG. 5 is a flowchart of a method of manufacturing the cooling device according to the present invention.

As shown in the drawing, at step S502, an upper plate or/and a lower plate having predetermined heights and flanges are manufactured by a drawing process.

At step S504, protrusions corresponding to each other are respectively formed on the upper plate and the lower plate by pressing predetermined portions of the upper and lower plates inwards, and reinforcing ribs are longitudinally formed on the upper plate and the lower plate to reinforce the upper and lower plates.

Preferably, the size of each protrusion of the upper plate is less than that of each protrusion of the lower plate so that a contact area between the photovoltaic module and the depressed portion of the protrusion of the upper plate is reduced to minimize the area of a portion of the photovoltaic module that is not cooled.

At step S506, an inlet port for injection of working fluid is formed on the lower plate provided with the protrusions and the reinforcing ribs.

Thereafter, the upper plate is joined to the lower plate by welding the corresponding protrusions to each other and by welding the flanges to each other, at step S508.

At step S510, a predetermined amount of working fluid for conducting the cooling operation by means of boiling and condensing is injected into the cooling chamber through the inlet port. Subsequently, at step S512, air is drawn out from the cooling chamber to make a vacuum, and the inlet port is sealed by pressing both sides thereof, thus completing the manufacture of the cooling chamber.

FIG. 6 is a schematic view illustrating the construction of a cooling device, according to a third embodiment of the present invention, showing the construction of the case where the cooling chamber is a heat pipe.

As shown in the drawing, an upper plate 61 of the heat pipe 60 includes an attaching part 61a which is attached to a photovoltaic module (not shown), and a dissipation part 61b which extends from the attaching part 61a. A wick 64 having a capillary structure is provided in the attaching part 61a. Support protrusions 63 are provided in the lower plate 62 at positions spaced apart from each other at regular intervals to support the wick 64.

In other words, the wick 64 of the upper plate 61 is supported by the support protrusions 63 of the lower plate 62 in an inner space 65 between the upper plate 61 and the lower plate 62.

Further, a heat sink 40 for dissipation of heat is attached to an outer surface of the lower plate 62 at a position corresponding to the dissipation part 61a of the upper plate 61.

In this construction, working fluid is contained both in a lower portion of the inner space 65 (opposite to the dissipation part 61b) and in the wick 64. The working fluid that is contained in the wick 64 and the lower portion of the inner space is evaporated by heat of the photovoltaic module and then ascends in a vapor phase. The ascending vapor transfers heat to the heat sink 40 or the air and thus condenses and cools off.

The condensed liquid is gradually evaporated by heat again while moving downwards along the wick 64.

FIG. 7 is a perspective view showing a lower plate of the cooling chamber assembled with a heat sink according to the third embodiment of the present invention. FIGS. 8 and 9 are, respectively, sectional views of the cooling device taken along line A-A and B-B of FIG. 7. FIG. 10 is a sectional view showing the installation of the cooling device of FIG. 8.

For the sake of explanation, a side at which a photovoltaic module 90 is disposed refers to an upper side, and the opposite side refers to a lower side.

As shown in the drawings, the cooling chamber 70 includes an upper plate 71 which is in contact with a lower surface of the photovoltaic module 90, and a lower plate 72 which is in contact with a heat sink 100. The cooling chamber 70 is sealed after working fluid that carries out the cooling operation by means of boiling and condensing has been injected into the cooling chamber 70.

The upper plate 71 and the lower plate 72 are bent inwards toward each other, to have predetermined heights, by drawing flat plates. Outer edges of the upper and lower plates 71 and 72 are bent outwards, thus forming flanges 73a and 73b.

During the drawing process, a plurality of reservoirs 75 for containing working fluid therein are longitudinally formed by protruding reservoir protrusions 74 from the lower plate 72 towards the upper plate 71. Reservoir protrusions 74 include supports 78 and side blocks 79.

Alternatively, reservoir protrusions 74 may be formed by a separate process and welded or bonded to the lower plate 72 to form the reservoirs 75 in the longitudinal direction.

Furthermore, guides 82 are alternately connected at predetermined angles of inclination to the left and right side blocks 79 of the reservoir protrusions 74. The guides 82 guide working fluid that flows downwards along the lower plate 72 so that the working fluid is stored in the reservoirs 75. Thereby, loss of the working fluid that flows downwards along the lower plate 72 is reduced. Preferably, the longitudinal distance between the adjacent reservoirs 75 ranges from 5 cm to 10 cm in consideration of the fact that the height to which working fluid rises up due to a capillary phenomenon is about 15 cm.

In addition, one of the opposite side blocks 79 of each reservoir protrusion 74 is shorter than the other one so that working fluid flows over the shorter side block 79 and enters the reservoir 75 that is disposed below.

Preferably, depressions 78a are respectively formed in the support 78 of each reservoir protrusion 74 and the side block 79 that is connected to the support 78, so that working fluid flows through the depressions 78a such that a capillary phenomenon is induced below the reservoir protrusions 74 having the depressions 78a.

Further, reinforcing ribs 90 having predetermined lengths are longitudinally provided on the lower plate 72 at positions spaced apart from each other to prevent the cooling chamber 70 from shrinking because of the vacuum force.

The lengths of the reinforcing rib 90 and the side block 79 are different from each other to prevent a horizontal blank from being formed in the cooling chamber 70, so that when working fluid moves in the horizontal direction, it is blocked by the reinforcing ribs 90 or the side blocks 79.

To prevent the cooling chamber 70 from being expanded outwards by heat and opening up, welding protrusions 83 are provided on the lower plate 72 at positions spaced apart from each other at predetermined intervals. The welding protrusions 83 are spot-welded to the upper plate 71.

Meanwhile, a wick 76 which absorbs and contains working fluid therein is provided under the upper plate 71 so that working fluid can be continuously supplied to the upper plate 71.

The wick 76 may be in contact with the upper plate 71 in such a way that it is bonded to the edge of the lower surface of the upper plate 71. Alternatively, the wick 76 may be in contact with the upper plate 71 in such a way that it is supported by wick supports 81 which are provided along opposite edges of the lower plate 72.

Holes are formed in portions of the wick 76, in which the welding protrusions 83 are disposed, so that the welding protrusions 83 are in contact with the upper plate 71 through the holes of the wick 76.

Further, a support net (not shown) which is loosely woven in a lattice shape is applied between the wick 76 and the reservoir protrusions 74, thus preventing the wick 76 from being undesirably removed from the upper plate 71.

In the present invention, the wick 76 may comprise a stainless steel sheet in which pores are formed by sintering, in detail, pores are formed by heating/pressing small stainless steel powder particles at a temperature lower than a melting point.

Furthermore, the wick 76 may be a stainless steel or plastic mesh. The plastic mesh is more inexpensive than the stainless steel sheet or mesh.

Particularly, when the thickness of the plastic mesh ranges from 0.5 mm to 0.9 mm, the number of meshes per inch (#/inch) ranges from 120 to 300. When two to five sheets of plastic mesh overlap each other, the capillary phenomenon is most active.

Not only a heat pipe but also a thermosyphon can be used as the cooling chamber 70, so long as it can carry out the cooling operation by boiling and condensing the working fluid.

The upper plate 71 and the lower plate 72 are made of SUS. The flange 73 of the upper plate 71 and the flange 73 of the lower plate 72 are welded or brazed to each other so that an inner space 77 is defined between the upper plate 71 and the lower plate 72. At this time, the welding protrusions 83 of the lower plate 72 are spot-welded to the upper plate 71. The working fluid is injected into the inner space 77 before the inner space 77 is sealed in vacuum.

As such, after the upper plate 71 is welded to the lower plate 72 and the working fluid is injected into the inner space therebetween, the inner space is vacuum-sealed, thus completing the manufacture of the cooling chamber 70.

In this embodiment, the upper plate 71 and the lower plate 72 are prevented by the reinforcing ribs 80 from shrinking due to vacuum force. The upper and lower plates 71 and 72 are prevented by the welding protrusions 83 from being expanded by heat. Particularly, because there is no horizontal blank in the cooling chamber 70 due to the reinforcing ribs 80 and the side blocks 79, the upper and lower plates 71 and 72 can be more effectively prevented from shrinking due to the vacuum force.

The heat sink 100 having a plurality of dissipation fins 104 is attached to the lower plate 72 of the cooling chamber 70, thus completing the cooling device. The upper plate 71 is attached to the lower surface of the photovoltaic module 90. The photovoltaic module 90 is installed at an angle such that it faces the sun.

The photovoltaic module 90 and the cooling chamber 70 may be attached to each other by a thermal conductive adhesive or, alternatively, a bolting method using nuts and bolts.

Furthermore, the upper plate 71 of the cooling chamber 70 is brought into surface contact with the entirety of the lower surface of the photovoltaic module 90. The heat sink 100 is brought into surface contact with a portion of the cooling chamber 70.

In this embodiment having the above-mentioned construction, to produce the required power after the photovoltaic module 90 has been installed at an angle, solar cells 92 constituting the photovoltaic module 90 receive solar light and convert it into electric energy, thus generating voltage. The voltage generated by the solar cells 92 is gathered together and then output to the outside of the photovoltaic module 90.

In each solar cell 92, some solar light cannot be converted into electric energy. The solar light energy that has not been converted into electric energy is converted into thermal energy, thus increasing the temperature of the photovoltaic module 90.

Heat of the photovoltaic module 90 is transferred to the working fluid of the cooling chamber 70 through the upper plate 71 which is in surface contact with the lower surface of the photovoltaic module 90. The working fluid that has been stored in the reservoir 75 or contained in the lower portion of the cooling member 70 or the wick 76 by the capillary phenomenon is evaporated by the heat and ascends in a vapor phase. The ascending vapor transfers heat to the heat sink 100 or the air and thus condenses and cools off.

The condensed liquid moves downwards along the inner surface, that is, the lower plate 71, of the cooling chamber 70 due to the force of gravity. During this, some of the condensed liquid is stored in the reservoirs 75 under the guidance of the guides 82, and the remaining condensed liquid flows downwards and gathers in the lower portion of the cooling chamber 70.

Furthermore, the working fluid that is in each reservoir flows over the shorter side block 79 and enters the reservoir 75 that is disposed below. The working fluid flows downwards through the depressions 78a, which are formed in the supports 78 or the side blocks 79 connected to the supports 78, and is contained in the wick 76 by the capillary phenomenon.

As such, due to the repeated circulation of the working fluid, heat generated from the photovoltaic module 90 is effectively dissipated.

As described above, the reservoirs 75 which store working fluid therein are formed in the cooling chamber 70 at predetermined positions spaced apart from each other, and the wick 76 comprising a plastic mesh is provided under the upper plate 71. Thus, a dryout phenomenon in the cooling chamber 70 is prevented, so that the working fluid is uniformly supplied to the entire area of the cooling chamber 70.

Furthermore, thereby, the boiling and condensing of the working fluid are further activated, thus enhancing the cooling efficiency. In addition, the temperature of the photovoltaic module 90 can be restrained from excessively increasing, thus preventing deterioration of the solar cells 92, and increasing the lifespan of the solar cells 92.

The invention claimed is:

1. A cooling device for a photovoltaic module, comprising:
a cooling chamber comprising:
an upper plate having a predetermined height, the upper plate being attached to a rear surface of the photovoltaic module in such a way as to be in surface contact with each other;
a lower plate having a planar shape, the lower plate being joined to the upper plate so that an inner space is defined between the upper plate and the lower plate; and
a working fluid injected into the inner space, the working fluid carrying out a cooling operation by means of boiling and condensing,
wherein a plurality of protrusions are formed on the upper plate and the lower plate by pressing predetermined portions of the upper and lower plates inwards in such a way as to face each other, the protrusions of the upper and lower plates being joined to each other; and
a heat sink in surface contact with the lower plate of the cooling chamber, the heat sink dissipating heat to an outside.

2. The cooling device for the photovoltaic module as set forth in claim 1, wherein the upper plate is manufactured by a drawing process.

3. The cooling device for the photovoltaic module as set forth in claim 1, wherein each of the protrusions formed on the upper plate is smaller than each of the protrusions formed on the lower plate.

4. The cooling device for the photovoltaic module as set forth in claim 1, wherein a reinforcing rib is provided on at least one of the upper and lower plates to reinforce the cooling device of the photovoltaic module,
the reinforcing rib being oriented in a direction in which the protrusions are arranged.

5. The cooling device for the photovoltaic module as set forth in claim 1, wherein the cooling chamber comprises either a heat pipe or a thermosyphon.

6. The cooling device for the photovoltaic module as set forth in claim 1, wherein the cooling chamber further comprises an inlet port through which the working fluid is injected into the cooling chamber,
the inlet port being provided on the lower plate.

7. The cooling device for the photovoltaic module as set forth in claim 1, wherein the heat sink further comprises a cooling fan,
the cooling fan forcibly supplying air to the heat sink to cool the heat sink.

8. The cooling device for the photovoltaic module as set forth in claim 1, wherein the cooling member further comprises, in the upper plate thereof:
an attaching part attached to the photovoltaic module;
a dissipation part extending from the attaching part; and
a wick provided in the attaching part, the wick having a capillary structure,
the wick being supported by support protrusions provided on an inner surface of the lower plate at positions spaced apart from each other at predetermined intervals.

9. The cooling device for the photovoltaic module as set forth in claim 8, wherein the heat sink is attached to an outer surface of the lower plate at a position corresponding to a location of the dissipation part.

10. The cooling device for the photovoltaic module as set forth in claim 1, wherein the cooling chamber further comprises a thermoelement.

11. The cooling device for the photovoltaic module as set forth in claim 1,
wherein flanges are formed on edges of the upper and lower plates, and
the upper plate is joined to the lower plate by the flanges.

12. The cooling device for the photovoltaic module as set forth in claim 11,
wherein the heat sink further comprises an elastic clip, and
the clip is fitted over the flanges of the upper and lower plates.

13. The cooling device for the photovoltaic module as set forth in claim 10,
wherein the thermoelement comprises an N-type semiconductor element and a P-type semiconductor element, and
the N-type semiconductor element and a P-type semiconductor element are connected to the cooling chamber by a metal plate.

14. A cooling device for a photovoltaic module, comprising:
a cooling chamber comprising:

an upper plate having a predetermined height, the upper plate being attached to a rear surface of the photovoltaic module in such a way as to be in surface contact with each other;

a lower plate having a predetermined height, the lower plate being joined to the upper plate so that an inner space is defined between the upper plate and the lower plate; and a working fluid injected into the inner space, the working fluid carrying out a cooling operation by means of boiling and condensing, wherein a plurality of protrusions are formed on the upper plate and the lower plate by pressing predetermined portions of the upper and lower plates inwards in such a way as to face each other, the protrusions of the upper and lower plates being joined to each other; and a heat sink in surface contact with the lower plate, the heat sink dissipating heat to an outside.

15. The cooling device for the photovoltaic module as set forth in claim 14, wherein each of the upper and lower plates is manufactured by a drawing process.

16. The cooling device for the photovoltaic module as set forth in claim 14, wherein flanges are formed on edges of the upper and lower plates, and the upper plate is joined to the lower plate by the flanges.

17. A cooling device for a photovoltaic module, comprising:

a cooling chamber having an upper plate and a lower plate, with a working fluid contained in an inner space defined by the upper plate and the lower plate, the working fluid carrying out a cooling operation by means of boiling and condensing;

a heat sink in surface contact with the cooling chamber, the heat sink dissipating heat to an outside;

a plurality of reservoirs formed on the lower plate, the reservoirs storing the working fluid therein; and a wick provided in the upper plate, the wick absorbing the working fluid therein.

18. The cooling device for the photovoltaic module as set forth in claim 17, wherein each of the reservoirs comprises a reservoir protrusion protruding towards the upper plate.

19. The cooling device for the photovoltaic module as set forth in claim 18, wherein each of the reservoirs further comprises a guide guiding the working fluid to be stored in the corresponding reservoir.

20. The cooling device for the photovoltaic module as set forth in claim 18, wherein the reservoir protrusion comprises a support or a side block.

21. The cooling device for the photovoltaic module as set forth in claim 20, wherein the guide is connected to the side block at an angle in a direction in which the working fluid flows, whereby the working fluid is guided into the reservoir by the guide.

22. The cooling device for the photovoltaic module as set forth in claim 18, further comprising:

a plurality of reinforcing ribs having predetermined lengths, the reinforcing ribs being provided on the lower plate at positions spaced apart from each other by a predetermined distance to prevent the cooling chamber from shrinking due to vacuum force.

23. The cooling device for the photovoltaic module as set forth in claim 22, wherein the lengths of the reinforcing ribs differ from a length of the side block.

24. The cooling device for the photovoltaic module as set forth in claim 18, wherein the lower plate further comprises:

a plurality of welding protrusions to prevent the cooling chamber from being expanded by heat.

25. The photovoltaic module with the cooling device as set forth in claim 18, wherein the reservoirs are spaced apart from each other in a longitudinal direction of the cooling chamber by a distance ranging from 5 cm to 10 cm.

26. The cooling device for the photovoltaic module as set forth in claim 17, wherein the wick comprises one among a stainless steel mesh, a plastic mesh and a stainless steel sheet having pores formed by sintering.

27. The cooling device for the photovoltaic module as set forth in claim 17, wherein the wick comprises two to five sheets of plastic mesh overlapping each other, each sheet of plastic mesh having a thickness ranging from 0.5 mm to 0.9 mm.

28. The cooling device for the photovoltaic module as set forth in claim 27, wherein a number of meshes per an inch (#/inch) of the plastic mesh ranges from 120 to 300.

29. The cooling device for the photovoltaic module as set forth in claim 17, wherein the wick is bonded to an edge of the upper plate or supported by wick supports provided along each of opposite edges of the lower plate at positions spaced apart from each other by a predetermined distance.

30. The cooling device for the photovoltaic module as set forth in claim 18, further comprising:

a support net provided between the wick and the reservoir protrusions to prevent the wick from being removed.

31. The cooling device for the photovoltaic module as set forth in claim 20, wherein the side block comprises side blocks disposed on left and right sides of the reservoir, and a length of the left side block differs from a length of the right side block.

32. The photovoltaic module with the cooling device as set forth in claim 20, wherein a depression is formed in the support so that the working fluid flows through the depression.

* * * * *